United States Patent [19]

Edde

[11] 3,832,985
[45] Sept. 3, 1974

[54] NON-POLLUTION CARBURETION SYSTEM FOR ENGINES

[76] Inventor: Robert C. Edde, P.O. Box 3294, Beirut, Lebanon

[22] Filed: June 11, 1971

[21] Appl. No.: 148,201

[52] U.S. Cl............. 123/141, 123/117, 123/127 R, 123/136 R, 123/122 A, 123/122 AA, 123/119 R
[51] Int. Cl. ... F02m 29/00, F02m 31/00, F02p 5/04
[58] Field of Search............ 123/122 A, 122 E, 136, 123/117 A, 141

[56] References Cited
UNITED STATES PATENTS

| | | | |
|---|---|---|---|
| 1,873,082 | 8/1932 | Uostrez | 123/141 |
| 2,090,673 | 8/1937 | Gombos | 123/141 |
| 2,097,216 | 10/1937 | Schreurs | 123/141 |
| 2,251,999 | 8/1941 | Greco | 123/141 |
| 2,756,730 | 7/1956 | Patchan | 123/122 X |
| 2,867,197 | 1/1959 | McCollough | 123/117 A |
| 2,977,205 | 3/1961 | Austin | 123/141 |
| 3,150,652 | 9/1964 | Hollabaugh | 123/122 A |
| 3,162,184 | 12/1964 | Walker | 123/117 A |
| 3,289,659 | 12/1966 | Koole | 123/117 A |
| 3,301,242 | 1/1967 | Candelise | 123/117 A |
| 3,364,911 | 1/1968 | Baudry | 123/127 |
| 3,426,737 | 2/1969 | Walker | 123/117 A |
| 3,439,658 | 4/1969 | Simonet | 123/127 |
| 3,515,107 | 6/1970 | Joyce | 123/136 |
| 3,515,108 | 6/1970 | Deeter | 123/136 |
| 3,538,896 | 11/1970 | Tobias | 123/136 |
| 3,540,423 | 11/1970 | Tolees | 123/136 |
| 3,548,796 | 12/1970 | Gastinne | 123/136 |
| 3,570,578 | 2/1968 | Spelts | 123/136 |
| 3,635,201 | 1/1972 | High | 123/141 |
| 3,648,674 | 3/1972 | Ripoctor | 123/141 |

Primary Examiner—Laurence M. Goodridge
Assistant Examiner—Ronald B. Cox

[57] ABSTRACT

A fuel and ignition control system for an internal combustion engine for decreasing engine fuel consumption and for decreasing carbon monoxide and unburned hydrocarbon exhaust emissions which includes a carburetor, a pressurized fuel tank vented, when overpressurized, to the carburetor, a high speed venturi and at least one idle and low speed venturi in the carburetor, a throttle in the carburetor and means connected to the throttle for vacuum controlling the igniting distributor in response to the position of the throttle, a thermostatically controlled heated air inlet duct connected to the carburetor and heated from the engine coolant pump, a dry proportioning accelerating system connected to said carburetor for increasing fuel flow through said carburetor in response to the rate of engine intake manifold pressure rise, an engine coolant heated fuel evaporator connected to the air-fuel outlet of the carburetor, a liquid fuel interceptor and recuperator connected at one end to the fuel evaporator and connected at its opposite end to the intake manifold, means for drawing liquid fuel from the interceptor and recuperator and for evaporating at least a portion of the liquid fuel and returning such vapor to the intake manifold and means for heating the intake manifold with engine coolant.

45 Claims, 11 Drawing Figures

INVENTOR.
ROBERT C. EDDE
BY
Morgan, Finnegan, Durham & Pine
ATTORNEYS

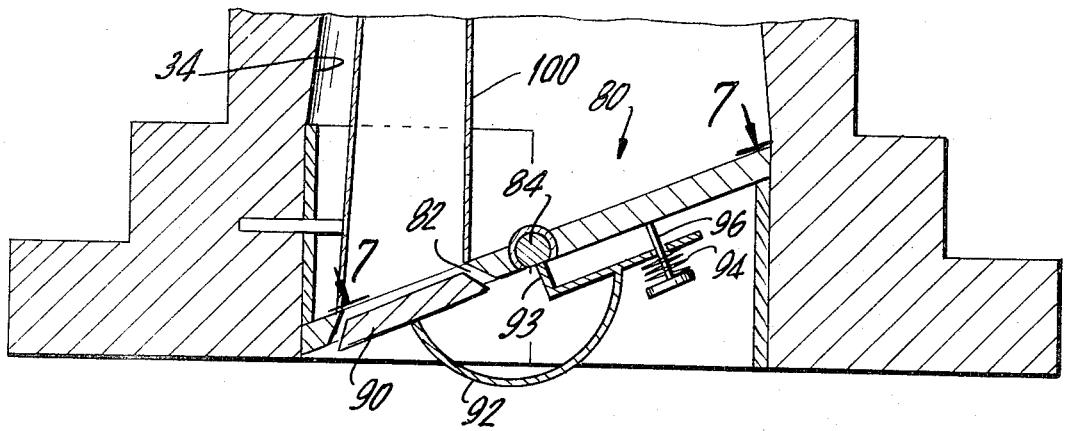
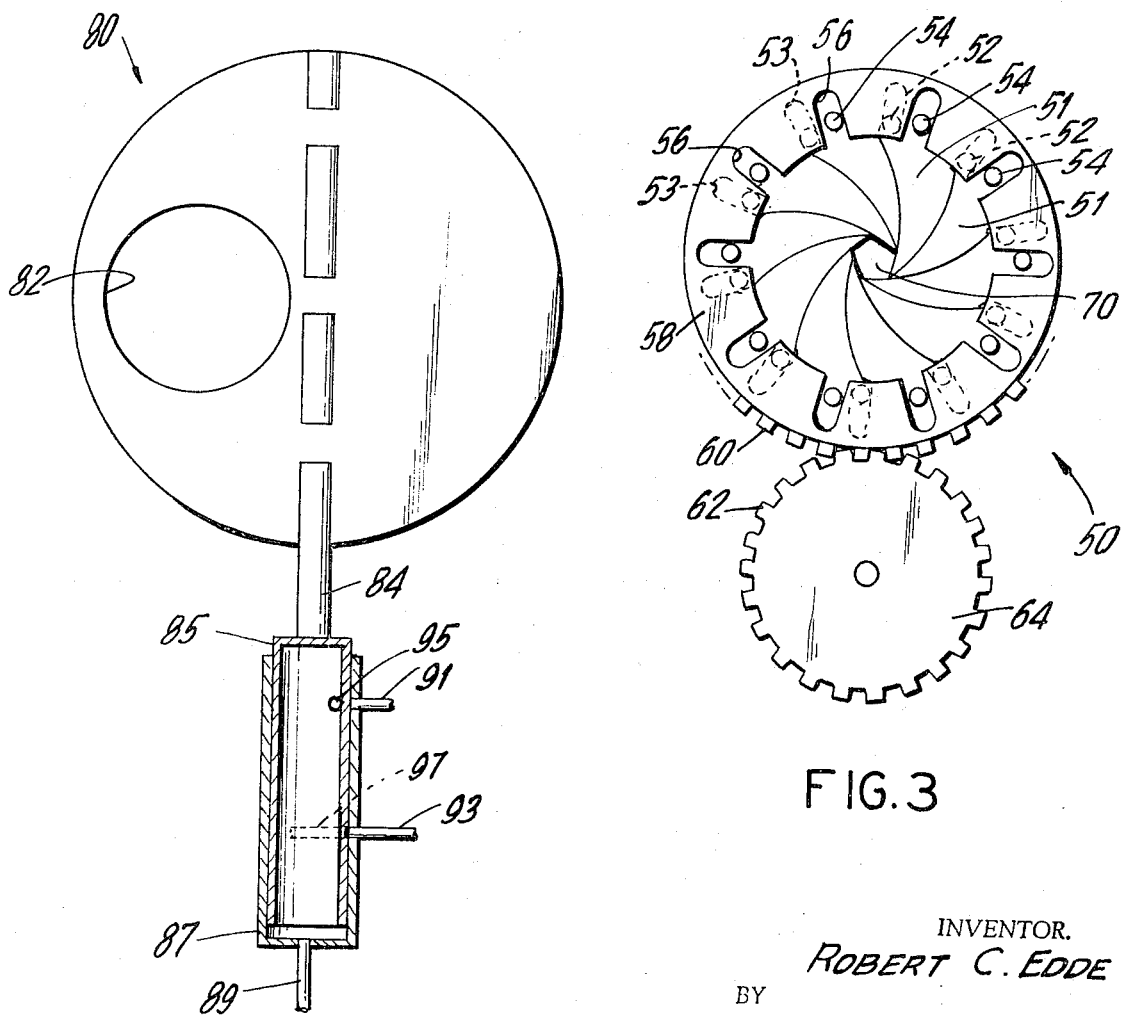

NON-POLLUTION CARBURETION SYSTEM FOR ENGINES

This invention relates to fuel systems and, more particularly, to fuel systems for automobiles, buses, trucks and the like.

One of the principal sources of air pollution in cities and densely populated areas are the fumes given off from the fuel systems of automobiles, buses, trucks, taxis, and the like. These fumes result from the vaporization of the fuel from tanks vented to the atmosphere, and to a greater extent, from gases formed when such fuel is combusted or burned in the internal combustion engine. Many of the gases formed when fuel is combusted, such as carbon monoxide and unburned hydrocarbons, as well as the volume of such gases formed, are due, to an appreciable extent to incomplete or improper combustion. One of the major causes of incomplete or improper combustion is improper fuel-to-air ratio in the combustion chamber and improper mixture of the fuel with the air.

There are, of course, a number of factors which affect the mixture of the fuel with the air in the fuel systems of automobiles, buses, trucks, taxis, and the like. For example, conventional carburetors are equipped with idle ports so located with respect to the throttle valve that, when the throttle valve is partly opened for idle engine speeds, the idle ports are exposed to manifold vacuum which causes fuel to be sucked through the idling jet and mixed with air drawn around the throttle valve. The air-fuel mixing action is inadequate and part of the fuel tends to run, as a liquid, along the bore wall of the carburetor. This condition requires a richer mixture to make up for the lack of complete fuel vaporization. This causes fuel waste and pollution. Furthermore, to meet individual engine vacuum characteristics, it is necessary to add to the idling jet a needle valve and to manually set the mixture ratio with the idle needle valve. Inaccurate adjustment of the needle valve becomes a source of additional fuel waste and pollution. Deceleration subjects the idling jet to very high vacuum causing an overly rich mixture. The least acceleration causes a vacuum drop in the carburetor and the ability to suck enough fuel is lost. This condition must be compensated by the intervention of the accelerating pump which sprays additional fuel loosely metered out and poorly vaporized.

Accelerating pump action occurs over the whole carburetion range and adds further to fuel waste and air pollution. These pumps are connected to the throttle so that, when the accelerator is depressed and the throttle valve in the carburetor is opened, the accelerator pump pumps a measured quantity of liquid fuel into the air stream passing through the carburetor and into the intake manifold. This measured quantity of liquid fuel supplements the fuel being drawn into the carburetor by the air passing through the carburetor venturi and is necessary because of the delay between the increased air flow, as the accelerator is depressed and the throttle valve is opened and the increase in flow of fuel into the carburetor resulting from such increased air flow.

While the acceleration pump is, in most instances, effective to supplement the fuel drawn into the carburetor until the increased air flow increases the fuel flow, the liquid fuel pumped into the air stream passing through the carburetor by the acceleration pump may not be in direct proportion to the fuel requirements as the spraying is only proportional to the motion of the accelerator and throttle valve and not proportional to engine requirements. Thus, more or less liquid fuel than is required may be pumped by the acceleration pump. This can cause the fuel-to-air mixture delivered to the combustion chamber to be overly rich or overly lean. In either event, improper combustion and air polluting gases result. In some instances, the liquid fuel pumped may exceed the vaporization ability of the air passing through the carburetor. When this occurs, noncombustible liquid fuel, rather than a mixture of fuel and air, may occur. More often, excessive pumping of liquid fuel occurs at engine start up and results in engine flooding; hard start and the exhaust of smoke saturated with polluting gases when the engine is finally started.

In addition to the foregoing, the conventional carburetor venturi must handle air and fuel requirements over a wide range of engine loads, speeds and operating conditions. At low loads and low speeds, velocity of the air through the conventional carburetor venturi is relatively low and mixing of the fuel with the air is relatively poor. This adds to fuel waste and resulting air pollution.

In the conventional fuel systems for automobiles, buses, trucks, taxis and the like, the carburetor is connected to an intake manifold which connects the carburetor to the cylinder intake ports. It can be of the single or split circuit type, the latter promoting better branch fuel distribution.

Usually the carburetor is centrally located over the intake manifold with controlled heat directed toward the carburetor base to promote better vaporization. However, the positioning of the carburetor throttle valve, combined with the incomplete fuel vaporization at the carburetor, allows liquid fuel droplets to enter the intake manifold and be distributed unequally to the various manifold branches. This results in variable air-fuel ratios in the various cylinders even if the fuel droplets vaporize in the intake manifold branches. This fact causes some of the cylinder mixtures to be lean and others to be rich. Fuel droplets that do not vaporize are not burned.

Even where each cylinder is equipped with an individual carburetor there is frequent liquid fuel carry over from carburetor to cylinder. Additionally, the individual carburetors in this multi-carburetor arrangement must be synchronized. Synchronizing of the carburetors is a difficult operation. In order to prevent power loss due to the leanness of some cylinders, to compensate for condensation or unvaporized fuel and to make up for all conditions responsible for the lack of complete vaporization caused by any adverse climatic or operating conditions, the initial carburetor mixture is voluntarily enriched over all ranges.

In the single and multi-carburetor systems, it is customary practice to set the fuel to be fed by the carburetor above the theoretical fuel requirements in order to prevent power loss and engine damage because of leanness in some cylinders, to compensate for fuel condensation and the lack of fuel vaporization and unequal distribution.

Many of the problems heretofore encountered with air pollution from the vaporization into the atmosphere of vapors from liquid fuel and from incomplete or improper combustion of fuel in the internal combustion engine are avoided in the fuel system of the instant invention. This is accomplished in the instant invention by eliminating the vent of the fuel storage tank to the atmosphere and, instead, pressurizing such tank and venting such tank to the carburetor when the pressure exceeds the relief valve setting. In the instant invention, an all induction carburetor, with one or more idling and low speed venturis within the main venturi and special throttle arrangements of the sliding or revolving type are provided.

At higher speeds and loads, carburetion is through the main venturi. At idling and low speed, up to about 60 kms per hour, or 40 mph, carburetion is through the idling and low speed venturi. At idling and low speed, the fuel is metered by the high velocity air stream passing through the smaller, idling and low speed venturi. The fuel is atomized and entrained in the high velocity air stream. Leaner mixtures than can be accomplished with the idling and low speed circuit of the conventional carburetor are afforded and the idle needed valve is eliminated because the effects of individual engine vacuum characteristics on mixture ratio requirements have no effect on the induction system. Furthermore, deceleration does not enrich the mixture, as in the conventional carburetor, because air velocity through the idle and low speed venturi, rather than vacuum, provides the fuel requirements. Acceleration in the all induction carburetor of the present invention may cause engine vacuum drop but such drop will not adversely affect the fuel-air mixture ratio through the idling and low speed venturi where air velocity, and not vacuum, is controlling. On the contrary, acceleration response is excellent because of air rushing through a small venturi. No complementary fuel requirement, such as provided by accelerating pumps, is needed. Because, in the all induction carburetor of the present invention, carburetion through the main venturi is limited to higher engine speeds and loads, the main venturi operates at higher air velocities throughout its operating range. Thus, when the main venturi is in operation, the fuel is atomized and entrained in a high velocity air stream and affords improved acceleration response.

During rapid engine acceleration, there is a sudden increase in manifold pressure or drop in the intake manifold vacuum because the throttle valve has been rapidly opened. Rapid opening of the throttle valve causes a sudden rush of additional air through the carburetor. However, because of fuel inertia, such sudden rush of air does not result in an immediate corresponding increase in fuel flow. Consequently, there is a leaning out of the fuel-air ratio. To instantaneously correct for this leaning out tendency, the carburetor of the present invention compensates for fuel inertia by exerting pressure on the fuel in proportion to the rate of manifold pressure increase or drop in manifold vacuum. This is accomplished with a pressure transfer arrangement which imparts pressure to the liquid fuel in proportion to the rate of change in manifold conditions. The added pressure imparted to the fuel overcomes the fuel inertia and provides the required fuel flow without delay.

When the rate of change in manifold pressure or vacuum conditions is relatively slow, there is no increase in fuel flow imparted by the transfer arrangement of the instant invention, as will be later explained. Unlike the normal acceleration pump that indescriminately sprays liquid fuel into the carburetor venturi, the acceleration arrangement of the instant invention maintains the correct fuel-to-air ratio during rapid engine accelerations. When the engine is stopped, the arrangement of the instant invention, as will be later explained, will not spray a single drop of fuel into the carburetor venturi. Engine choking or flooding is thus avoided.

In addition to the features discussed above, the instant invention includes a condensation control system to assure fully vaporized and identical air-fuel mixture to all cylinders. Only gaseous mixture is admitted to the intake manifold. Recondensation is prevented through the use of a double walled manifold and by circulating hot water from the engine cooling system through the manifold to heat the manifold and to maintain the preheated fuel-air mixture above the dew point temperature. To prevent liquid fuel from entering the manifold, a recuperator having a single or multiple gap with a negative pressure applied at the gap or gaps, is installed between the carburetor and the intake manifold. Liquid fuel reaching the gap or gaps is drawn out of the recuperator into a sump through a pipe shrouded by calibrated exhaust gases for reheating. The withdrawn heated liquid fuel is vaporized and the fuel vapor is fed to the intake manifold. The liquid fuel which is not vaporized is returned to the fuel tank. With the double walled intake manifold hot and the fuel-air mixture at operating temperature, liquid fuel drawn out by the recuperator is heated by the calibrated exhaust, vaporized and fed to the intake manifold. When the intake manifold is cold and the fuel-air mixture is below operating temperature, the liquid fuel withdrawn by the recuperator is not vaporized to the intake manifold but is returned to the fuel tank or exhausted from the system. Thus, the fuel-air mixture in the intake manifold is completely gaseous and equally distributed. There is no liquid fuel in the intake manifold. Fuel waste and air pollution are avoided. The carburetor mixture can be set to provide optimum theoretical ratio of fuel and air for complete combustion over the full operating range of speed and load of the engine.

The fuel system of the instant invention not only avoids fuel waste and resulting air pollution but eliminates oil dilution, engine flooding, reduces oil pumping, minimizes combustion deposits and reduces engine wear. Clean engine and top performance result. Carbon monoxide and unburned hydrocarbons in the exhaust are eliminated.

The instant invention will be more fully understood from the following description and the referenced drawings in which:

FIG. 3 is an enlarged top plan view of the throttle valve and throttle valve control taken at line 3—3, FIG. 2;

FIG. 6 is an enlarged sectional view of the throttle valve of FIG. 5;

FIG. 7 is a top plan view, taken at line 7—7, FIG. 6 showing the main throttle control and the vacuum advance valve;

Figure 1:
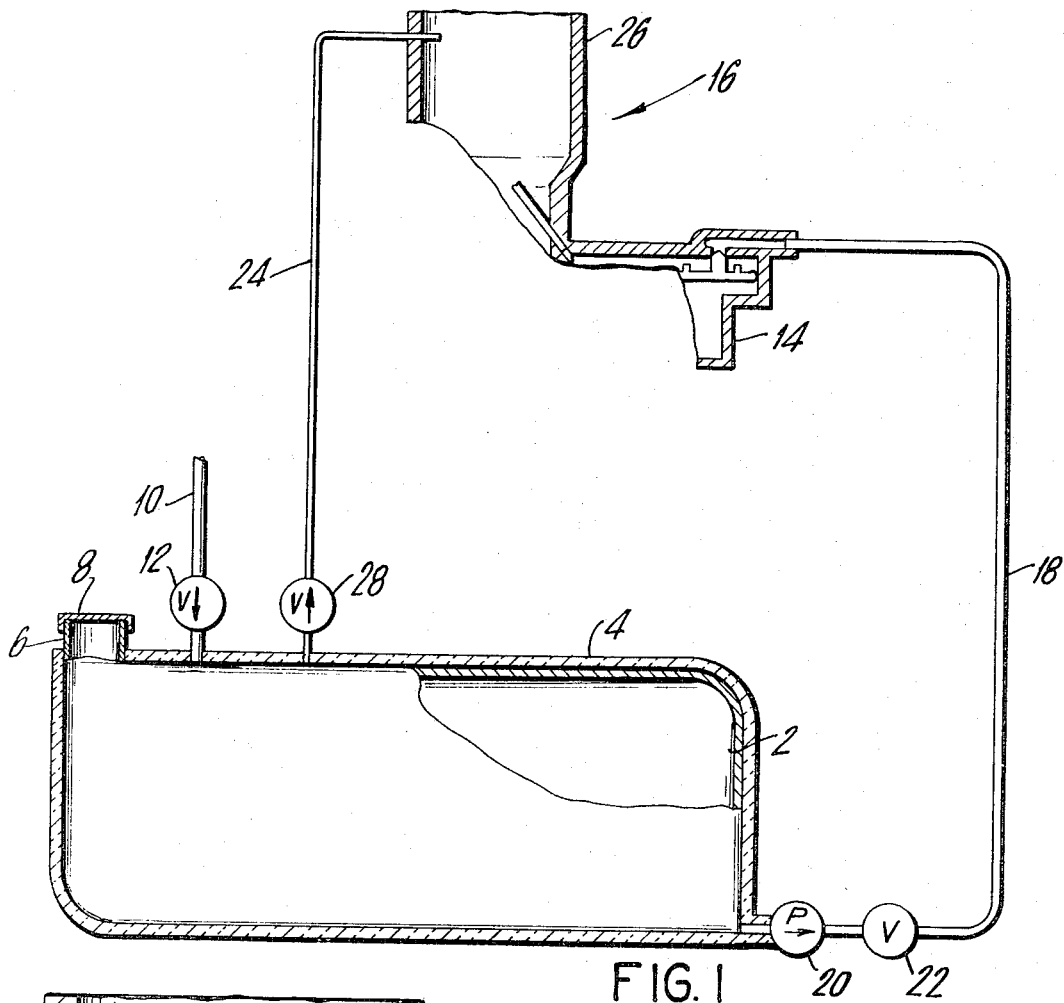
FIG. 1 is a schematic view, partly in section, of the tank feed system of the instant invention.

Referring to the drawings, fuel tank 2 may be of conventional construction but, preferably, is of heavy gauge metal insulated with insulation 4. Tank 2 is provided with a fill spout 6 having a hermetically sealed cap 8 connected in conventional manner to spout 6 but, when in place, forming a hermetic seal on spout 6. Cap 8 is removed for filling tank 2 with fuel, in conventional manner and is reinstalled and resealed after filling. Vent line 10, having a one-way spring loaded valve 12, vents the atmosphere to the inside of tank 2 so that, when the inside of tank 2 is below atmospheric-pressure, spring loaded valve 12 opens and remains opened until the pressure in tank 2 and the atmospheric pressure are equalized. As will be later more apparent, when the pressure in tank 2 is above atmospheric pressure, valve 12 is closed.

Tank 2 is connected to float chamber 14 of carburetor, generally designated 16, by conduit 18. Fuel pump 20 in conduit 18 pumps fuel, in conventional manner, from tank 2 to carburetor 16, and may be a mechanical pump operated from the engine or an electric pump of the type commonly employed on some automobiles, buses, trucks, taxis and the like. Intermediate pump 20 and carburetor 16, there is provided in conduit 18 a constant pressure valve 22. Valve 22 assures a constant fuel pressure at float chamber 14 thereby preventing the float chamber from becoming over-pressurized which in the conventional low pressure carburetor float system could result in forcing the needle valve in the float chamber off of its seat and cause flooding of the engine.

Tank 2 is vented, by conduit 24, to the intake end, or horn, 26 of carburetor 16, above the choke, not shown. One-way valve 28 in conduit 24, is a spring loaded check valve set to open at a pressure above the vaporization pressure of the fuel but below the design pressure of the fuel tank. When the pressure in tank 2 exceeds the preset pressure, one-way valve 28 opens and vents the excess vapor in tank 2 through conduit 24 and into carburetor 16 where such vapors are fed, through the carburetor and into the combustion chamber of the engine where such vapors are combusted or burned.

In the fuel tank system of FIG. 1, when cap 8 is removed and the tank is being filled, the air and vapors in the tank, as the fuel enters, are vented out through spout 6. Because, in most instances the fuel is stored underground and, in hotter weather when fumes are more common, is cooler than ambient temperature, many of the hotter fumes in the tank are cooled by the cooler fuel, are condensed and remain in the tank. When the tank has been filled or partially filled, cap 8 is reinstalled and hermetically seals spout 6. Any vapors which later form, because of the heating of the fuel by the tank and the ambient air are vented to the carburetor through conduit 24 and one-way valve 28. By insulating tank 2 with insulation 4, heating of the fuel and vaporization caused thereby is reduced.

Figure 2:
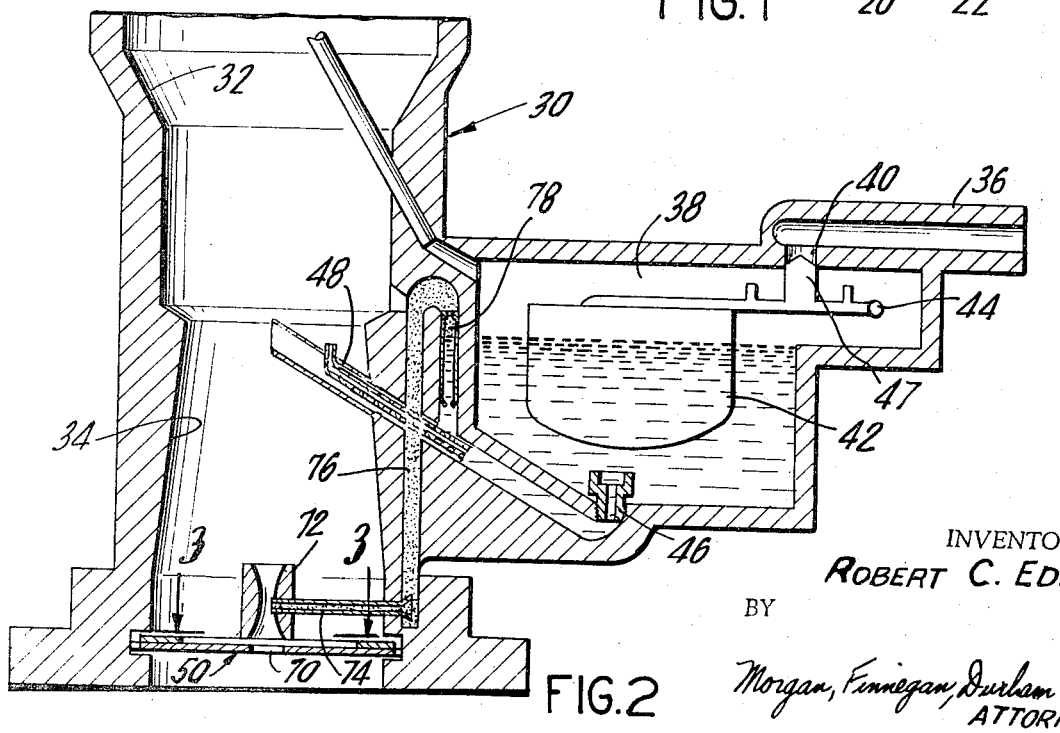
FIG. 2 is an enlarged sectional side view of the carburetor of FIG. 1 showing one embodiment illustrative of the all induction carburetor of the instant invention adapted to a sliding type throttle valve.

Referring to FIG. 2, the all induction carburetor of the instant invention includes the conventional carburetor housing 30, having at its top a conventional air inlet, or horn 32 and venturi passage 34 and, at its bottom, means, such as bolts and a gasket, not shown, for mounting such carburetor on the intake manifold of the internal combustion engine. Fuel is delivered, through conduit 36, to float chamber 38 through needle valve port 40. Float 42, pivotally mounted, at 44, controls needle valve 47 in port 40 for regulating the flow of fuel through conduit 36 into float chamber 38. At normal operation of the engine with the throttle open, or partially open, air is drawn through air inlet, or horn, 32 and, in passing through venturi 34 into the intake manifold, draws fuel from float chamber 38, through metering jet 46 and conduit 48 into venturi 34. The fuel is vaporized in the air in venturi 34 and the vaporized fuel is drawn into the intake manifold and the combustion chamber or chambers where such vapor is ignited and combusted or burned.

The carburetor arrangement and flow described above is, substantially, the flow arrangement customarily found in carburetors for internal combustion engines. In such carburetors, the air flow and, hence, the fuel flow is regulated by a butterfly or revolving valve in the bottom of the carburetor near the intake manifold. In such customary arrangement, while there is substantial air flow, the venturi action of the carburetor is sufficient to draw and mix the fuel with the air and form the required combustible fuel-air vapor mixture. At idle speeds, however, the venturi action in the conventional carburetor is substantially reduced and lost. Hence, it has heretofore been the practice to feed into such carburetor, when the throttle valve is substantially closed, a metered amount of fuel through an idle port located just below, on the intake side, of the throttle. As has been noted, at this location the engine vacuum draws fuel through the idle port for mixture with the air at idle engine speed. Because the fuel fed through the idle port is discharged into one side of the air stream flowing around the throttle valve at idle speed, the fuel is not adequately mixed and vaporized with the air. Furthermore, a portion of the fuel discharged through the idle port flows, as droplets, along the wall of the carburetor bore and into the intake manifold.

In the embodiment of the induction carburetor of the instant invention illustrated in FIGS. 2 and 3 the revolving type valve of the conventional carburetor arrangement is replaced with a sliding valve, generally designated 50, exemplified by a camera type adjustable diaphragm consisting of a plurality of blades 51, each pivotally mounted, at pin 52 in a slot 53 in a fixed base and each having a pin 54. Each of the pins 54 is positioned in a slot 56 in a rotatable plate 58. Teeth 60 on plate 58 mesh with teeth 62 on throttle control plate 64. By rotating control plate 64 from, for example, the accelerator pedal with suitable linkage, not shown, blades 51 are opened and closed, regulating the flow of air through venturi 34.

As best shown in FIGS. 2 and 3, blades 51, when the throttle valve closes, form a smaller passageway 70 for air at approximately the center of the carburetor throat. In this embodiment of the invention, idle and low speed-low load venturi 72 is mounted in the carburetor throat in axial alignment with passageway 70 so that air, at idle and low engine speed, low engine load, is drawn through venturi 72. With air passing through venturi 72, fuel is drawn through conduits 74, 76, and idle and low speed jet 78. Fuel drawn into venturi 72 is mixed with the air flowing through venturi 72, much like the mixture of the fuel with the air at higher speeds when throttle 50 is open. Thus, a more homogenous mixture of the fuel and air and a more readily combustible mixture of such fuel and air is provided than in the conventional carburetor arrangement.

In the embodiment of FIG. 2, sliding valve 50 controls the flow of air through main venturi 34 and idle and low engine speed venturi 72. Thus, with sliding valve 50 fully closed, flow of air through main venturi 34 and idle and low speed venturi 72 is cut off, for example to stop the engine and when the engine is not running. As sliding valve 50 is opened, air is permitted to pass through idle and low speed venturi 72, first at low volume and, as valve 50 is opened further, at increased volume. As valve 50 is further opened and opens radially outwardly past venturi 72, air passage increases further and main venturi 34 then operates.

At idle engine speed and at low engine speed-low engine load, the fuel to air ratio and mixture is controlled through the passage of air through idle and low speed-low load venturi 72. Sliding valve 50 is partially closed and main venturi 34 is not in operation. At higher engine speeds and higher loads, valve 50 is opened further and main venturi 34 then operates, atomizing and mixing the fuel with the air for such higher speeds and loads.

While the sliding valve embodiment of FIGS. 2 and 3 has been shown and described with one venturi in addition to the main venturi, it is obvious that additional venturis, concentric to the added venturi, may be employed, each venturi accommodating a selected engine speed and load.

Figure 4:
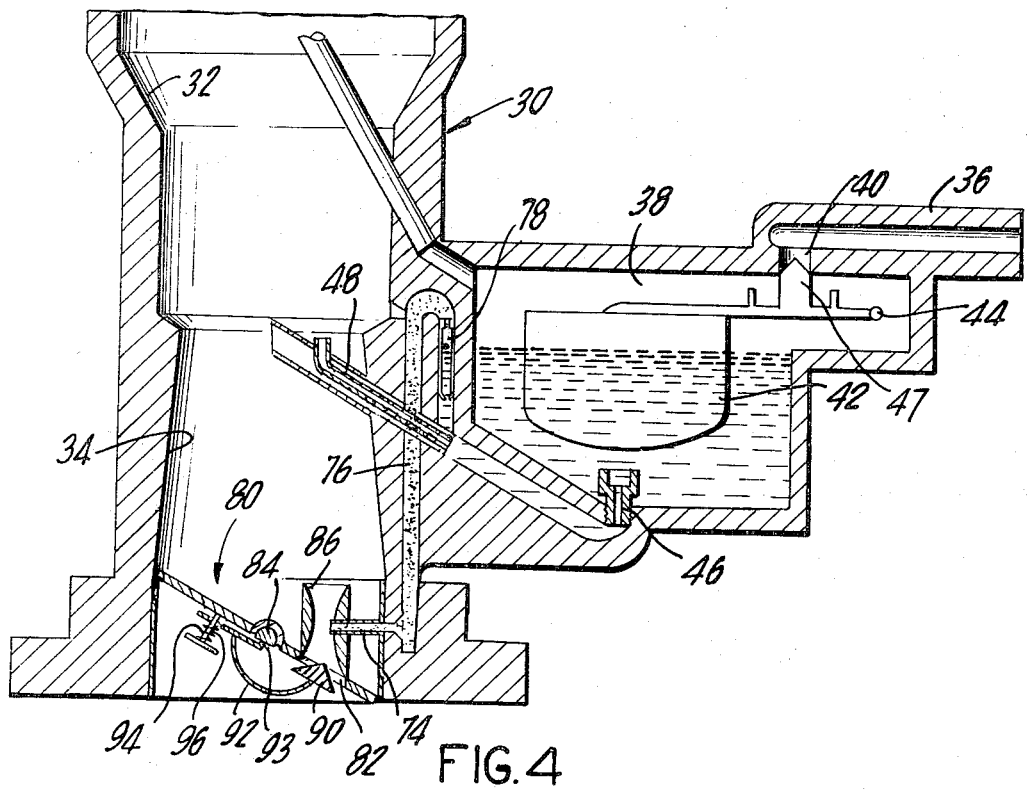
FIG. 4 is a sectional view similar to FIG. 2 but showing a modified embodiment of the carburetor of FIG. 2 adapted to a revolving throttle valve.

The embodiment of FIG. 4 is similar to that of FIG. 3 but, instead of the sliding valve, in this embodiment rotating valve 80, having a circular opening 82 is substituted. Rotating valve 80 is pivotally mounted on a shaft 84 and is opened and closed in conventional manner. Venturi 86 is mounted to one side of shaft 84 and is in axial alignment with circular opening 82 when throttle valve 80 is closed.

Secondary throttle plate 90 is mounted on one end of throttle plate fork 92. Fork 92 is connected, at 93, to throttle shaft 84 and, at its opposite end, is engaged by spring 94 on pin 96 fixed to butterfly valve 80.

With rotating valve 80 open, i.e., in vertical position, fuel is drawn into venturi 34 from float chamber 38 and is mixed with the air in venturi 34, in conventional manner, to form the required high speed fuel-air mixture. As throttle shaft 84 is rotated counter-clockwise, as viewed in FIG. 4, fork 92, through spring 94 and pin 96 rotates valve 80 counterclockwise until valve 80 is closed, forming a seal around valve 80 with the throat of the carburetor. As this seal is formed, secondary throttle plate 90 is open and air is drawn through venturi 86, drawing fuel from passageways 74, 76 past idle and low speed jet 78. The fuel drawn into venturi 86 is mixed in the venturi with the air passing therethrough and the mixture is drawn into the intake manifold and combustion chamber or chambers, not shown. As shaft 84 is rotated further counter-clockwise, fork 92 compresses spring 94 and closes secondary throttle plate 90, partially cutting down the flow of air drawn through venturi 86 and opening 82 and further throttling the engine.

Figure 5:
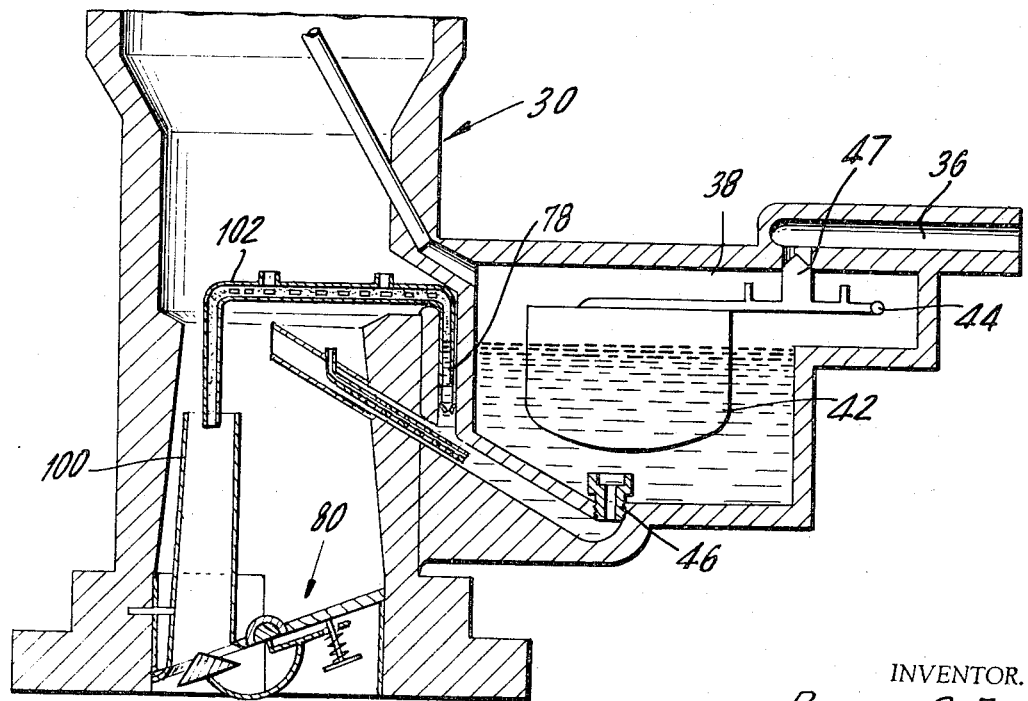
FIG. 5 is a sectional view similar to FIG. 4 but showing a further modification of the invention.

The throttle arrangement in the embodiment of FIGS. 5 and 6 is similar to the arrangement in FIG. 4 with the exceptions that, in this embodiment, the throttle is closed by clockwise rotation, a longer venturi 100 is provided and the fuel is drawn into the top of the venturi 100 through conduit 102.

In conventional carburetor arrangements it is customary to connect up the carburetor to the distributor vacuum advance unit through a porthole located slightly above the idling position of the throttle plate. In that fashion smoother idling is achieved as distributor vacuum advance unit is practically exposed to atmospheric pressure and the only spark advance (usually 5° BTDC) is the recommended manufacturer's setting of the centrifugal distributor mechanism which only varies with the engine RPM.

As throttle plate opens up more, the porthole becomes exposed to the engine vacuum which is then transmitted to the distributor vacuum advance unit which will provide additional spark advance dependent on the engine vacuum.

In the instant invention, control is accomplished through an external valve configuration connected to the throttle linkage.

Referring to FIG. 7, sleeve 85 is fixed, at its closed end, to throttle shaft 84 and is rotated, as shaft 84 is rotated to open and close the throttle. Sleeve 85 is mounted in fixed sleeve 87 forming an air-tight chamber with fixed sleeve 87. An O-ring, or other suitable seal, may be provided adjacent the open end of fixed sleeve 87 and the closed end of rotatable sleeve 85 to prevent air leakage into or out of the chamber formed by such sleeves. At its closed end, fixed sleeve 87 is connected, at 89, to the vacuum advance control on the distributor, not shown. Fixed sleeve 87 has a port 91 connected to the atmosphere and is connected, at 93, to the intake manifold of the engine, as is conventional. Sleeve 85 has a circular port 95, aligned with port 91 of sleeve 87 and a groove 97 aligned with connection 93.

When the main throttle plate 80 is fully closed and secondary throttle plate 90 is open for idling, port 95 is aligned with port 91. Thus, the vacuum control on the distributor, through connection 89, port 95 and port 91 is vented to the atmosphere and there is no advancement of the spark. As throttle shaft 84 is rotated, further opening secondary throttle plate 90 from idle to low speed, low load position, port 95 is rotated out of alignment with port 91 and groove 97 is rotated into alignment with connection 93 to the intake manifold. Hence, the venting of the vacuum control on the distributor to the atmosphere is cut off and the vacuum control is connected to the intake manifold and the spark is advanced.

The throttle controlled advancement, effected in the vacuum control of the instant invention, is in direct relationship to the throttle position and the required ignition timing for such throttle position. Unlike the conventional distributor vacuum arrangement, where control is factory set and there is no adjustment, in the instant arrangement, by adjusting the positioning of port 95 and groove 97 relative to ports 91, 93 and by the shape of groove 97, the point at which the distributor vacuum control is operated and the degree of operation, or ignition timing control, can be adjusted. By manual adjustment of fixed sleeve 87 relative to sleeve 85, adjustment can be made at any time to attain desired operating conditions.

Figure 8:
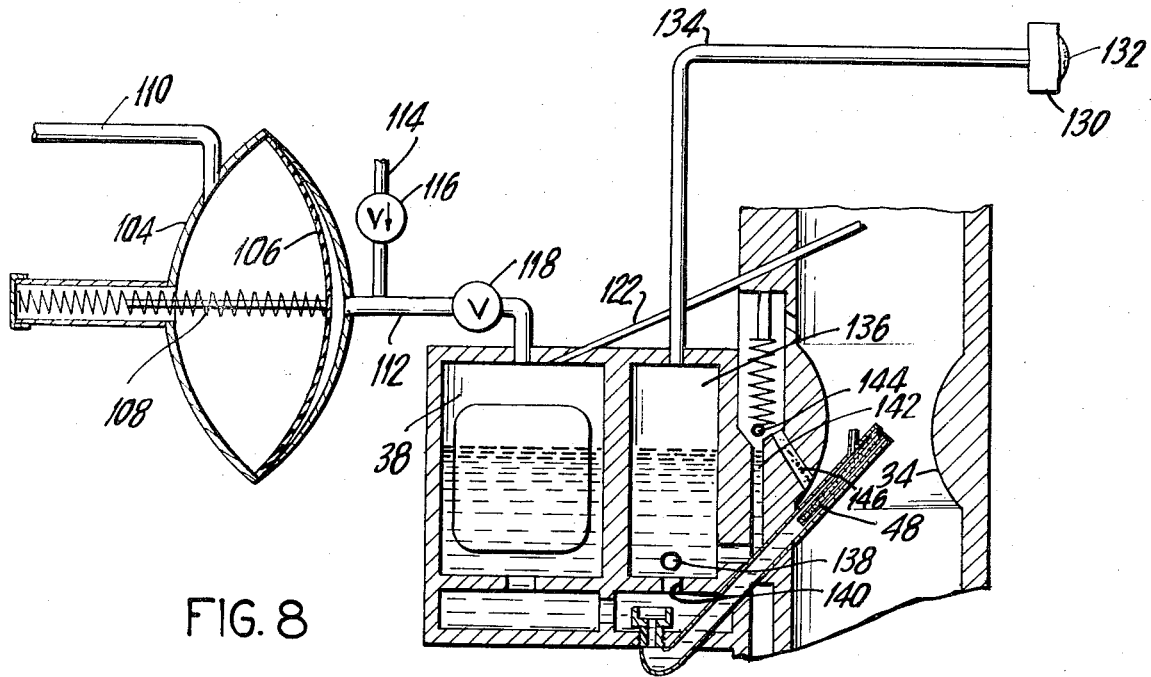
FIG. 8 is an enlarged side view, partly in section, illustrative of the dry acceleration system of the instant invention and showing one form of pressure transfer system.

Referring, next, to FIG. 8, the all induction carburetor of FIGS. 2 to 7 may include a conventional acceleration pump, hooked to the throttle linkage but, preferably, in place of the conventional pump includes the intake manifold actuated dry proportioning accelerating system shown, in FIG. 8.

The intake manifold actuated pressure transfer unit includes housing 104, having a flexible diaphragm 106 urged by spring 108 toward the right side of housing 104, as viewed in FIG. 8. At the spring side of diaphragm 106, housing 104 is connected, by conduit 110, to the intake manifold, not shown. At the opposite side of diaphragm 106, housing 104 is connected by conduit 112 to the top of float chamber 38 of the carburetor. Conduit 112 is connected by conduit 114 and one-way valve 116 to the atmosphere. For purposes later described, conduit 112 is provided with a regulator 118.

During fixed throttle deceleration and slow acceleration the intake manifold of the internal combustion engine is below atmospheric pressure or at partial vacuum. Thus, the partial vacuum in the intake manifold, connected to housing 104 through conduit 110 draws diaphragm 106 to the left of housing 104, compressing spring 108. When attempt is made to rapidly accelerate the engine by quick depression of the accelerator and quick opening of the carburetor throttle valve, the immediate loading causes the partial vacuum to be momentarily lost, until the engine speeds up, and diaphragm 106, no longer being held to the left of housing 104 by the intake manifold vacuum, is moved rapidly to the right, as viewed in FIG. 8, by compressed compression spring 108. As this rapid movement of diaphragm 106 occurs, air is forced through conduit 112, past regulator 118 and into float chamber 38. The rapid surge of air into float chamber 38 exceeds the capacity of float chamber bleed 122 to accommodate such air. Thus, float chamber 38 is pressurized and fuel is forced without delay from the float chamber through passageway 48 into venturi 34 of the carburetor and into the air stream moving therethrough. This fuel forced into the air stream, maintains the correct air-fuel ratio which would otherwise have been instantaneously leaned out and allows proper engine acceleration. When the engine accelerates, a partial vacuum again forms in the intake manifold and such partial vacuum, through conduit 110, draws diaphragm 106 back to the left, as viewed in FIG. 8, recompresses spring 108 and the unit is re-set for the next rapid acceleration. In the case of slow acceleration rate, there is no leaning out of the air-fuel ratio. In the instant apparatus, progressive engine pressure rise during slow acceleration causes slow displacement of diaphragm 106 and the resulting slow displacement of the air is vented through bleed 122 without appreciable build up of pressure on the fuel in float chamber 38.

When the engine is shut down, the throttle valve in the carburetor is, of course, closed. The closed throttle tends to hold the partial vacuum in the intake manifold but, slowly, this vacuum is lost. As the partial vacuum is lost in the intake manifold, compressed compression spring 108 slowly moves diaphragm 106 to the right, as viewed in FIG. 8. This slow movement of diaphragm 106 does not provide the same rapid surge of air that results from rapid acceleration. Thus, regulator 118, which is pre-set for rapid surge, opens slowly and the air is exhausted from conduit 112 through bleed 122. When the engine is started up and after acceleration, the partial vacuum in the intake manifold draws diaphragm 106 to the left in housing 104. As diaphragm 106 is drawn to the left, one-way valve 116 opens and admits air to conduit 112 and such air is drawn into housing 104. Once diaphragm 106 is at its full left hand position, with spring 108 compressed, one-way valve 116 closes. The dry proportioning accelerating system of the instant invention can be connected to the carburetor accelerator pump chamber, with the conventional pump removed, or can be built into the carburetor. Other types of pressure transfer systems, rather than the system illustrated, can be used for dry proportion acceleration.

The vacuum actuated acceleration pump of FIG. 8 is, of course, only effective during engine operation. Thus, such pump is ineffective for engine start-up. To provide the necessary fuel charge for engine start-up, the carburetor may be provided with a conventional piston pump, actuated by a pull rod from the dashboard or, preferably, dash pot 130 having a finger operated diaphragm 132 is mounted on the dashboard, or other accessible location, and is connected by conduit 134 to acceleration pump chamber 136 of the carburetor. Except for conduit 134, pump chamber 136 when filled with fuel is closed, Thus, to start the engine, diaphragm 132 is pushed, with the finger, causes a surge of air into chamber 136 and this surge of air causes check valve 138 to close in seat 140. The pressure in pump chamber 136 forces the fuel out of chamber 136, through passage 142, opens valve 144 and the fuel is forced through passage 146 into venturi 34. Thus, fuel is provided for engine start-up and, if additional fuel is to be provided, diaphragm 132 can again be finger pressed and the operating cycle repeated.

Figure 9:
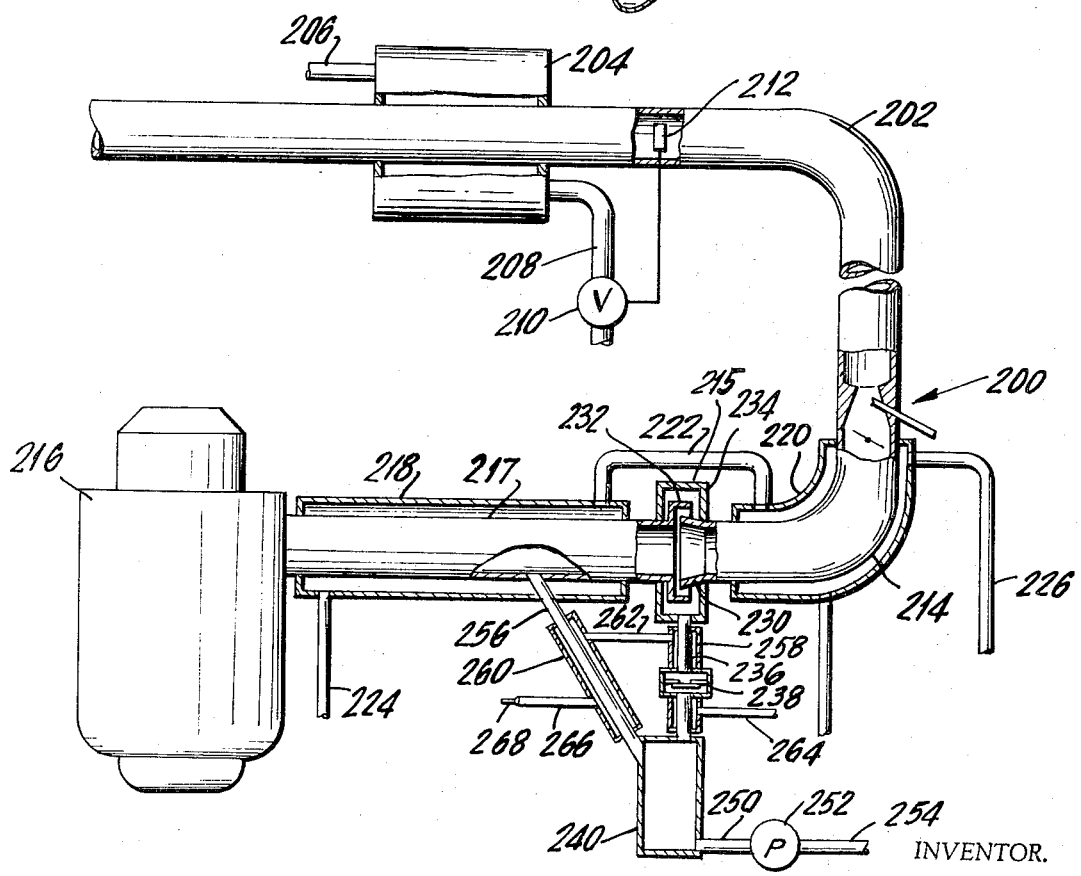
FIG. 9 is a schematic view of one embodiment of the condensation control system of the instant invention.
Figure 10:
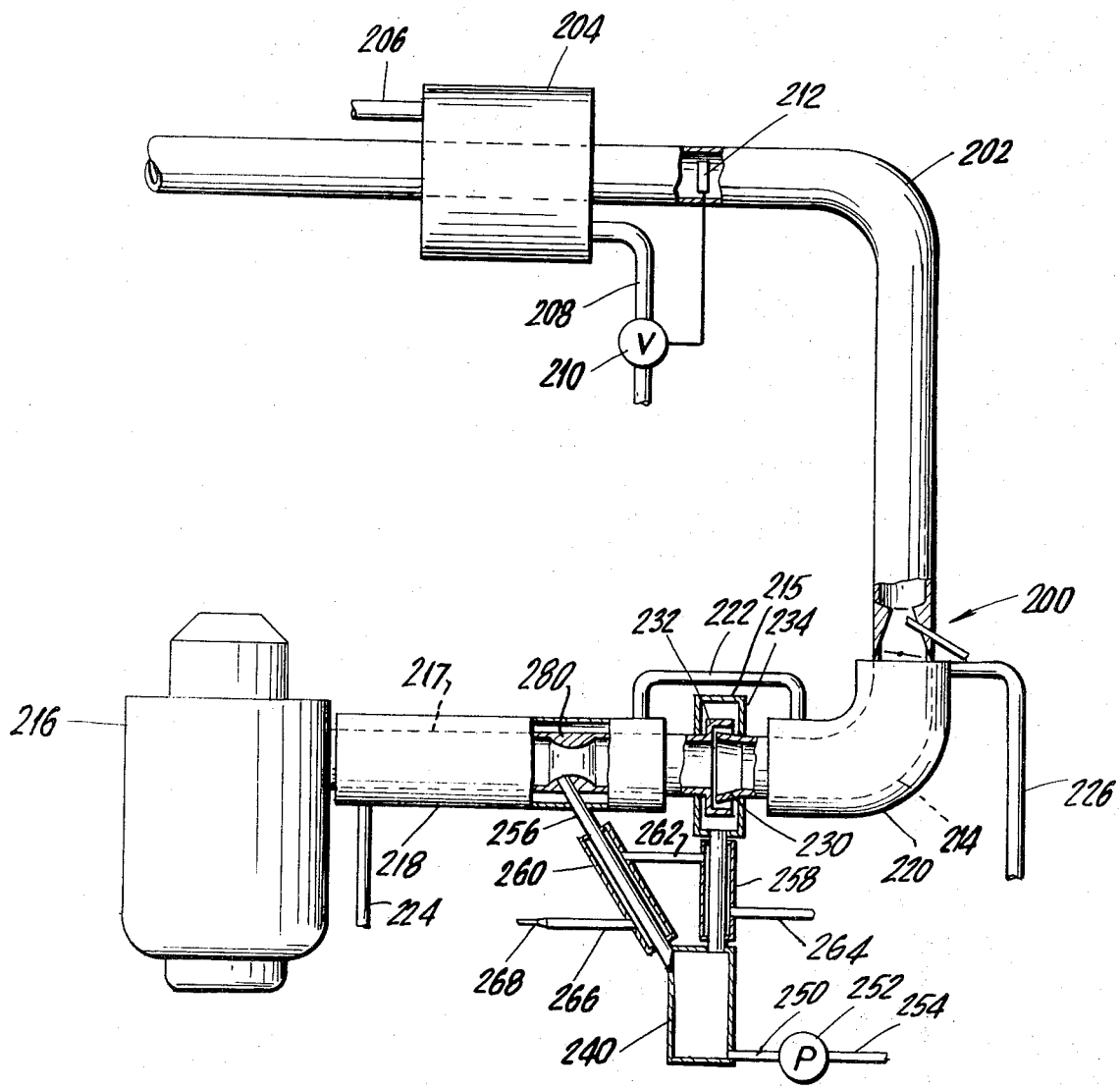
FIG. 10 is a view similar to FIG. 9 but showing a modification of the embodiment of FIG. 9.
Figure 11:
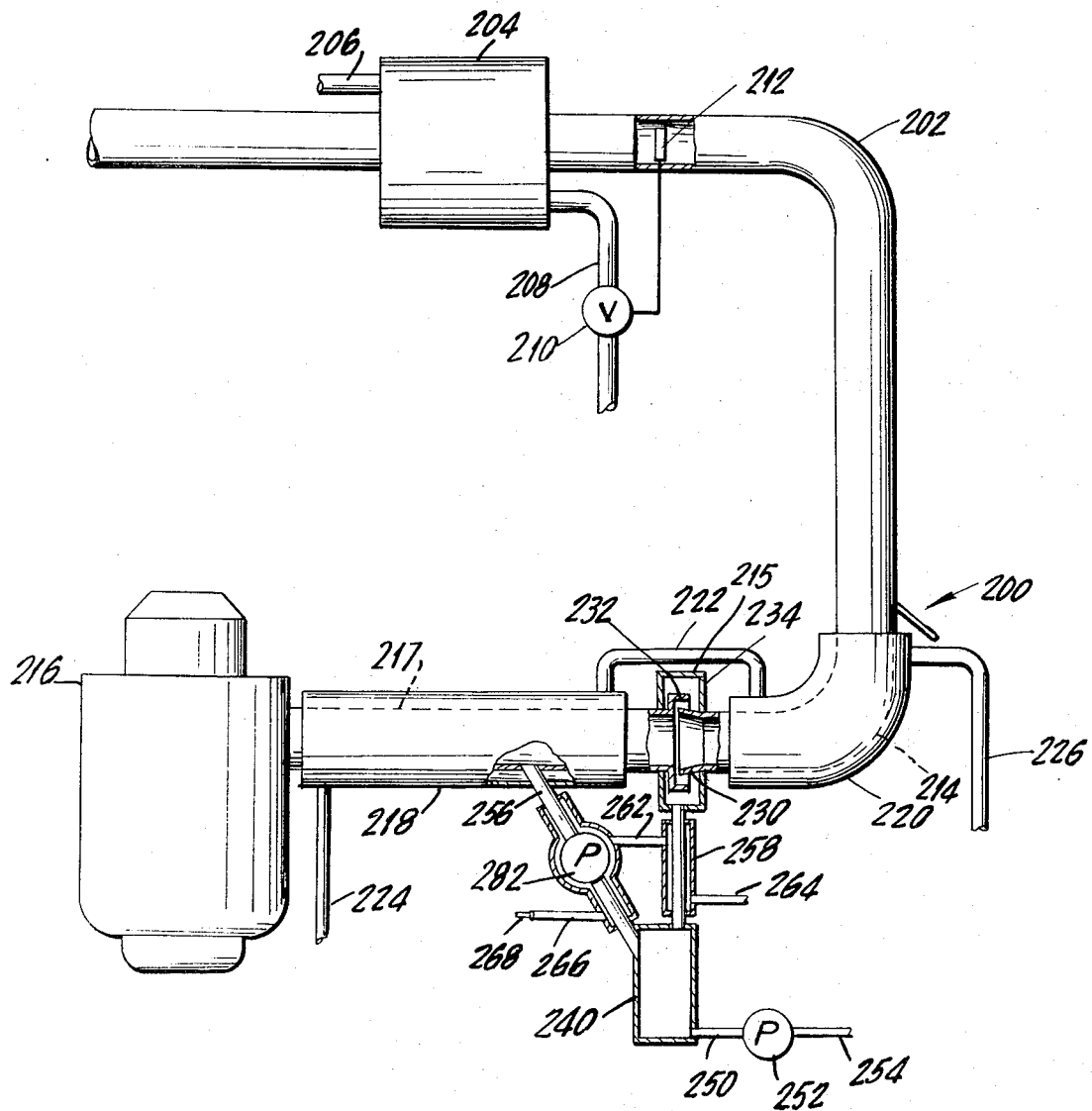
FIG. 11 is a view similar to FIG. 9 but showing a further modification of the embodiment.

Referring next to FIGS. 9, 10 and 11, the condensation control system, which is an important feature of the instant invention, may be used along with the conventional fuel tank and carburetor or may be combined with the fuel tank and carburetor arrangement of the instant invention to provide an overall improved fuel system for internal combustion engines.

Considering, first, the embodiment of such control system illustrated, diagrammatically, in FIG. 9, intake air is drawn into carburetor, generally designated 200, through duct 202. Duct 202 has a heat exchanger 204, connected at its inlet 206 to the vehicle coolant system and hot water pump outlet, not shown, and connected at its outlet 208 to the pump inlet for the return of heated coolant, passing through heat exchanger 204, thereto. The circulation of heated coolant from the water pump through heat exchanger 204 and back to the pump is controlled by thermostatically controlled valve 210, the element 212 for controlling valve 210 being in the air stream, in duct 202, downstream of heat exchanger 204.

Elbow 214 is connected, at one end, to the carburetor 200 and at its other end to the recuperator, generally designated 215 which, in turn is connected to intake manifold 217. Elbow 214 and manifold 217 have heater jackets 218, 200, interconnected at 222. Engine heated coolant, from the vehicle hot water pump, not shown, enters jacket 218, at inlet 224, passes through connection 222 to jacket 220 and is returned to the pump, not shown, through outlet 226.

Recuperator 215, intermediate its ends, is in two pieces, the end of one piece being slightly flared at 230 and fitting in to the enlarged end 232 of the other piece, for reasons later discussed.

Flared end 230 is spaced slightly away from enlarged end 232 forming a slight gap therebetween. Ends 230, 232 are surrounded by and encased in housing 234. Line 236, having a check valve 238 is connected at one end to housing 234 and, at its other end, to sump 240. The lower end of sump 240 is connected by conduit 250 to solenoid controlled sump pump 252 and sump pump 252 is connected by conduit 254 to the main fuel tank. The upper end of sump 240 is connected by a conduit 256 to intake manifold 217. Line 236 and conduit 256 are surrounded, respectively, by heater jackets 258, 260 interconnected by line 262. Heater jacket 236 is connected at 264 to the exhaust manifold so that exhaust gases pass into jacket 258 through inlet 264 and then pass through line 262 into jacket 260 and are discharged through discharge connection 266 and through restricted opening 268.

The location of recuperator 215, relative to carburetor 200, is critical. Recuperator 215 should be sufficiently spaced from the carburetor so that liquid fuel and fuel droplets in the fuel-air mixture are flowing along or close to the wall so as to be intercepted and removed by recuperator 215. Furthermore, the fuel-air mixture passing through recuperator 215 should not be so turbulent that liquid fuel and droplets will bypass the gap between ends 230, 232 and be carried over into manifold 217.

In the embodiment of FIG. 9, air entering carburetor 200 through duct 202 is heated by the hot engine coolant passing through exchanger 204. When the air passing through duct 202, as the engine is warmed up, reaches the desired temperature, thermostat valve 210 responsive to element 212 in duct 202 opens, regulates the flow of heated coolant through heat exchanger 204.

The heated air, passing through carburetor 200, draws fuel from the carburetor into the air stream. The vaporized fuel-air mixture passes through intake manifold 217 into engine 216. Because intake manifold 217 is heated by heater jacket 218, cold spots in the intake manifold, which might otherwise cause some of the fuel in the fuel-air mixture to condense, are avoided.

During acceleration, rapid changes in throttle setting, engine starting, full throttle conditions or, for any other reason, all of the fuel entering the air stream at carburetor 200 may not vaporize. When this occurs, liquid fuel passes into heated elbow 214 beneath the carburetor, and may become vaporized in the air. However, any of the fuel that is not vaporized in the elbow will be removed where the flared end 230 of recuperator 215 fits into the enlarged end 232.

The embodiment of the invention illustrated in FIG. 9 is particularly adapted for use in engines, such as one or two cylinder engines, in which there is a substantial time lapse in intake valve operation and a resulting pulse action in the intake manifold. In such an engine, when the intake valve opens and the piston travels downwardly on the intake stroke, an instantaneous negative pressure pulse below average intake manifold pressure occurs in the intake manifold. In the embodiment of FIG. 9, this pulse is relied upon to provide suction, opening one-way valve 238 and drawing liquid fuel through recuperator 215 into sump 240 and fuel vapors through conduit 256 into intake manifold 217. As the liquid fuel is drawn into line 236, a portion, if not all, of the liquid fuel is vaporized by the heat from the exhaust gases passing through jacket 258 and such vaporized fuel is drawn through conduit 256, the heat from the exhaust gases passing through jacket 260 maintaining the fuel vaporized. Any liquid fuel that remains in sump 240 is returned to the main fuel tank by solenoid control sump pump 252.

The embodiment of the condensation control system illustrated in FIG. 10 is identical to the embodiment illustrated in FIG. 9 except that one-way valve 238 of FIG. 9 is omitted and replaced with venturi 280 in intake manifold 217.

The embodiment of the condensation control system illustrated in FIG. 10 is adapted for use with engines where there is no substantial pulse action in the intake manifold.

In the embodiment of FIG. 10, the stream velocity through venturi 280 is higher than the stream velocity at either end of the venturi and at recuperator 215. This pressure differential results in a negative pressure in conduit 256, sump 240, line 236 and in recuperator 215, at the gap and draws the liquid fuel from recuperator 215 into line 236. All, or part of, the liquid fuel drawn into line 236 is vaporized by the heat from the exhaust passing through jacket 258 and is drawn, through conduit 256, into intake manifold 217. Any fuel remaining in sump 240 is returned, by solenoid control sump pump 252, to the main fuel tank.

The embodiment of the condensation control system illustrated in FIG. 11 is substantially identical to the embodiments of FIGS. 9 and 10 with the exception that, in the embodiment in FIG. 11, vacuum pump 282 is substituted for one-way valve 238 in FIG. 9 and venturi 280 in FIG. 10. Vacuum pump 282, operated from engine 216 while the engine is operating, draws liquid fuel from recuperator 215 and pumps the revaporized liquid fuel through conduit 256 into intake manifold 217.

The apparatus of the instant invention was installed on a 1960 Chrysler Corporation "Valiant" having a one hundred and 70 cubic inch displacement engine and was road tested. The test results were compared with the results of road tests run at substantially identical test conditions on the same 1960 "Valiant" with the same engine but with a standard 3510 Carter carburetor fitted with a Carter 268 jet and a standard 3511 Carter carburetor fitted with a Carter 210 jet. The 3510 Carter carburetor, fitted with the Carter 268 jet, is conventional carburetor equipment on the one hundred and 70 cubic inch, 1960 "Valiant" engine for passenger cars and provides a richer fuel-air mixture than the Carter 3511 carburetor equipment used on taxicabs. The 3511 Carter carburetor used for the comparison tests was fitted with a Carter 210 jet, which makes it the leanest Carter carburetor available, leaner than the usual Carter 3511 carburetor with a Carter 209 jet (302cc) used on the 1960 "Valiant" engine sold for taxicabs.

The 1960 "Valiant" used for these tests was equipped with a manual gear shift and acceleration tests were run from 0 to 30 *k/hr* in first gear; 30 to 60 *k/hr* in second gear; and, 60 to 90 *k/hr* in third gear. In all instances, the tests were run with a clean engine. It was noted, however, that with the 3510 and 3511 Carter carburetors, carbon and combustion deposits formed in the engine combustion chambers. With the carburetor arrangement of the instant invention, it was noted that the engine combustion chambers remained clean, i.e., there were no deposits of carbon or any other combustion deposits formed in the combustion chamber. It was also noted that, with the carburetor arrangement of the instant invention installed on the engine of the test vehicle after running with the standard 3510 or 3511 Carter carburetors and in which combustion deposits had formed in the combustion chambers, the combustion deposits that had formed with the standard carburetor, were eliminated after running the engine with the instant invention carburetor arrangement. In other words, the carburetor arrangement of the instant invention cleaned the combustion chambers and overhaul of the engine for this purpose was not necessary.

noted, these comparative tests were performed with clean engine and, while the conventional carburetors result in combustion deposits, such deposits do not form with the instant carburetion system. Because such combustion deposits adversely affect fuel consumption and engine power, the fuel savings, without loss in acceleration or engine power resulting from the use of the instant carburetion arrangement are even greater than shown from the foregoing tests.

While fuel savings are, of course, important, a more important advantage of the instant invention, as has already been noted, is the substantial decrease in air pollution. The air-to-fuel ratios in conventional carburetion systems are 11.5 to 1 at idle; 14.0 to 1 at part throttle; and, 12.0 to 1 at full throttle. The accepted exhaust gas constituents at these engine conditions as given in Marks Handbook, seventh Edition, Table 16, pp. 9–146, "Summary of Exhaust-Gas Constituents" (Gerrish & Voss), are, as follows:

TABLE II

| Idle | | | Part Throttle | | | Full Throttle | | |
|---|---|---|---|---|---|---|---|---|
| 11.5/1.0 | $CO_2$ | 9% | 14.0/1.0 | $CO_2$ | 13.02% | 12.0/1.0 | $CO_2$ | 10.18% |
| | $O_2$ | 0.2% | | $O_2$ | 0.63% | | $O_2$ | 0.44% |
| | CO | 7.5% | | CO | 2.09% | | CO | 6.65% |

The instant carburetor arrangement tested included the all induction carburetor of FIGS. 5 and 6; the vacuum distributor spark advance control of FIG. 7; the acceleration control of FIG. 8; and, the condensation control system of FIG. 10. The air temperature in duct 202 was maintained at around 50° C and the water temperature in intake manifold jacket 220 and elbow jacket 218 was maintained at 80° C.

The test results were, as follows:

Of the gases listed, the carbon monoxide (CO) results in air pollution. Chrysler Corporation has attempted to lower carbon monoxide exhaust emission by delaying ignition during idling of the engine so as to operate the engine, at idle, at a leaner mixture. The results of such delay in ignition, compared to standard idling conditions, are given at page 300, Automotive Encyclopedia, 1968 Edition, as follows:

TABLE I

| | Level Road 60/80 kH k/qt* | Acceleration 0 30 60 90 kH Time: secs Consumpt: cc | Acceleration 60 90 kH Time: secs Consumpt: cc | Single Hill Full Throttle Consumpt: cc Terminal Vel | Top Speed Level Road k/H |
|---|---|---|---|---|---|
| Std 3510 Jet 258: 360cc Venturi Net Area: 5.16cm² Step Up Rod: .032" | 10.1 k/qt | 15.70" 8.25cc | 7.60" 3.85cc | 34.1cc 98k/H | 152 k/H |
| Std 3511 Jet 210: 272cc Venturi Net Area: 5.16cm² Step Up Rod: .023" | 10.7 k/qt | 16.00" 6.6cc | 8.00" 3.30cc | 27.5cc 97k/H | 152 k/H |
| All Induction No 3 Jet Estimation: 245cc Venturi Net Area: 5.89cm² | 11.8 k/qt | 16.55" 5.72cc | 7.70" 2.99cc | 24.6cc 96k/H | 152 k/H |

* Fuel consumption at constant speeds of 60 k/H and 80 k/H, averaged.

As is shown from the foregoing comparative test results, the fuel consumption at the various comparable engine operating conditions was lower with the carburetion arrangement of the instant invention than with either the standard 3510 or the leanest 3511 Carter carburetors. Furthermore, it should be noted, such savings in fuel consumption did not essentially affect acceleration time nor engine power. As has been already

TABLE III

Ignition Timing

| | 10° BTDC | 5° ATDC | % Change from Std |
|---|---|---|---|
| RPM | 500 | 550 | +10% |
| Fuel-Air Ratio | .085 | .071 | −16% |
| HC | 495 ppm | 185 ppm | −63% |

TABLE III—Continued

| | Ignition Timing | | % Change from Std |
|---|---|---|---|
| | 10° BTDC | 5° ATDC | |
| CO | 7.4% | 1.1% | −85% |
| CO$_2$ | 10.4% | 14.1% | |
| O$_2$ | 0.1% | 0.3% | |
| Airflow | 35 lb/hr | 54 lb/hr | +54% |
| Fuel Flow | 3.0 lb/hr | 3.8 lb/hr | +27% |

As can be seen, from a comparison of the carbon monoxide content at idle in Table II with the carbon monoxide content at 10° BTDC in Table III, in both instances the carbon monoxide content are substantially the same. It should be noted that, while Table III shows a lowering of the percentage of carbon monoxide in the exhaust emission, when ignition is delayed, it also shows an increase of 10 percent in engine speed and 27 percent in fuel flow. Taken together, these increases indicate a net increase of 17 percent in fuel consumption, resulting in a net volume of carbon monoxide in excess of the percentage differential of the two ignition timings. By delay in ignition, engine efficiency and power are substantially lowered. Consequently, delay in ignition cannot be used for lowering carbon monoxide content at throttle settings above idle.

Exhaust gas samples from the apparatus of the instant invention tested in the tests of Table I were collected and analyzed at idle engine speed, part throttle and full throttle. Results of such exhaust gas analysis are summarized, as follows:

TABLE IV

IDLING

| Cold Engine Temp. 10°C<br>Automatic Choke Fully Closed<br>Engine Speed: 1,000 r.p.m. | | Warm Engine driven 80°C<br>Automatic Choke Fully Open<br>Engine Speed: 700 r.p.m. | |
|---|---|---|---|
| CO$_2$ | 10.7% | CO$_2$ | 10.7% |
| O$_2$ | 5.6% | O$_2$ | 5.7% |
| CO | 0.2% | CO | 0.2% |

60 Km/hr PARTIAL THROTTLE LEVEL ROAD

| First Test | | Second Test | |
|---|---|---|---|
| CO$_2$ | 13.0% | CO$_2$ | 13.0% |
| O$_2$ | 1.7% | O$_2$ | 1.6% |
| CO | 0.0% | CO | 0.0% |

70–80 Km/hr FULL THROTTLE UPHILL

| First Test | | Second Test | |
|---|---|---|---|
| CO$_2$ | 13.2% | CO$_2$ | 13.7% |
| O$_2$ | 1.4% | O$_2$ | 1.1% |
| CO | 0.0% | CO | 0.0% |

N.B. Subsequent to each full throttle test, the car was immediately driven full throttle over level road to check its maximum speed which easily reached 150 Km/hr.

From the analysis of Table IV, it is to be noted that at idle, with the automatic choke closed and with the choke open, there was only 0.2 percent of carbon monoxide and at partial and full throttle there was no carbon monoxide. This 0.2 percent of carbon monoxide is substantially lower than the 7.5 percent at idle in accepted exhaust gas constituents, Table II, and 7.4 percent and 1.1 percent, Table III. At part throttle and full throttle, Table IV, there is no carbon monoxide, as compared to 2.09 percent and 6.65 percent at like throttle conditions, Table II.

It is also to be noted, from the comparison in Table IV, that the carbon monoxide content of the exhaust gas at idling, cold engine, automatic choke fully closed is the same as when the engine is at operating temperature and the automatic choke is fully open. Thus, even during cold engine operation, when conditions for volatilizing the fuel in the air are the poorest, and with the fuel flow increased by the closed choke and exhaust gas air pollution is normally at the highest, in the instant carburetion arrangement there was no increase in polluting carbon monoxide. The absence of any increase in carbon monoxide is a clear showing of the effectiveness of the liquid fuel recuperator of the instant invention.

The carburetion arrangement of the instant invention not only reduces carbon monoxide to an inconsequential minimum, at idle, and eliminates such carbon monoxide at part and full throttle, but eliminates air pollution in yet another manner. Unburned hydrocarbons, combined with nitrogen oxides in the exhaust, when exposed to the rays of the sun under proper atmospheric conditions, cause smog. Such unburned hydrocarbons also cause carbon and other deposits in the combustion chamber. As has already been noted, carbon and other deposits are not formed in the combustion chamber when the carburetion arrangement of the instant invention is employed. Indeed, where such deposits exist because of operations with conventional carburetors, such deposits are burned out. Because, with the instant invention, such deposits are not formed, there is no unburned hydrocarbon in the exhaust gases and smog cannot form.

As is clearly shown by a comparison of Table I, II, III and IV, the fuel system of the instant invention provides better fuel economy, without sacrifice of engine performance and power, and, at the same time, eliminates air pollution. Combustion deposits are avoided, lowering engine maintenance costs. Furthermore, since liquid fuel is not admitted to the combustion chamber, contamination of the lubricating oil and the dilution of such oil by the fuel, another source of air pollution, is eliminated.

The carburetion arrangement of the instant invention can be installed on new cars, trucks, buses, taxis and the like, as original equipment or can be installed on older vehicles to replace original conventional carburetion equipment. The carburetion arrangement of the instant invention assures complete and full vaporization of the fuel-air mixture before such mixture enters the intake manifold for distribution to the combustion chambers of the individual cylinders. Liquid fuel and liquid droplets are removed from the fuel-air mixture before such mixture enters the intake manifold. Because the fuel-air mixture is completely and fully vaporized and the liquid fuel and liquid fuel droplets are removed, the fuel-air mixture distributed to each of the cylinders is uniform. Thus, with the carburetion arrangement of the instant invention, an exact, fully combustible fuel-air mixture can be fed to each cylinder. Excess fuel leading to the formation of deposits in the combustion chamber and to air pollution is avoided. Because, with the carburetion arrangement of the instant invention, carbon and other combustion deposits do not form and do not build up in the combustion chamber and the spark plugs the engine is continuously operated, throughout the life of the engine, under engine design conditions. The use of high octane fuels to offset changing engine conditions because of carbon and combustion deposits in the combustion chambers and spark plugs is eliminated.

The lack of formation of carbon and other combustion deposits with the carburetion system of the instant invention has a further advantage. In the conventional carburetion system, as such deposits form, there is a noticeable increase in fuel consumption. Thus, equipped with a conventional carburetor system, a new engine or engine in which the combustion chambers and spark plugs have been cleaned consumes less fuel than the same engine after it has been run and the deposits have formed. When the carburetion system of the instant invention is installed as the replacement for the conventional carburetion system on an engine that has been run and deposits have formed, there is a reverse effect on fuel consumption. As such engine is run with the instant invention carburetion system, deposits originally formed with the conventional carburetor in the combustion chambers and spark plugs are progressively burned and removed. As such deposits are removed and the combustion chambers and spark plugs are cleaned, fuel consumption with the instant carburetion system decreases. This decrease in fuel consumption is accompanied by an increase in engine power and efficiency. At the same time, pollutants in the exhaust gases do not form.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A fuel and ignition control system for an internal combustion engine having an intake manifold and carburetor comprising high speed venturi in said carburetor at least one idle and low speed venturi in said high speed venturi, high speed throttle means for regulating the flow of air through said high speed venturi and for cutting off the flow of air therethrough, idle and low speed throttle means on said high speed throttle means for regulating the flow of air through said idle and low speed venturi and for cutting off the flow of air therethrough, means for regulating said high speed and said idle and low speed throttles, a distributor, a vacuum control means on said distributor, means connecting said vacuum control means to the intake manifold of the engine for actuating said vacuum control in response to the pressure in said intake manifold, valve means on said throttle regulating means for venting said vacuum control connecting means to the atmosphere when said throttles are at idle engine speed and for connecting said connecting means to said intake manifold when said idle and low speed throttle is opened, a dry proportioning accelerating means, means for connecting said accelerating means to said intake manifold, means for connecting said accelerating means to said carburetor, means in said accelerating means responsive to an increase in pressure in said intake manifold for forcing liquid fuel from said carburetor into the carburetor air stream in proportion to the rate of increase in pressure in said intake manifold, an air intake duct connected to the air inlet of said carburetor, a heat exchanger on said air intake duct for heating intake air passing through said duct, means for circulating coolant from the coolant pump of the engine through said heat exchanger, a thermostatically controlled valve in said coolant circulating means, means in said intake air stream for controlling said thermostatically controlled valve, fuel evaporator means connected at its upstream ends to the air-fuel mixture discharge end of said carburetor, a liquid fuel recuperator connected at one of its ends to the downstream end of said evaporator and connected at its opposite end to said intake manifold, a heating jacket on said intake manifold and said evaporator, means connected to the engine coolant pump for circulating heated coolant through said heating jacket, a liquid fuel sump, means for drawing liquid fuel from said recuperator to said sump, a conduit connecting the upper end of said sump to said intake manifold, means for heating said liquid fuel drawing means and said conduit for vaporizing liquid fuel in said drawing means and for maintaining said fuel vaporized in said conduit, means for drawing the vaporized fuel from said conduit into said intake manifold and means for removing liquid fuel from the bottom of said sump.

2. A fuel and ignition control system, as recited in claim 1, in which said high speed and idle and low speed throttle means is a sliding valve.

3. A fuel and ignition control system, as recited in claim 2, in which said high speed throttle means is a throttle plate.

4. A fuel and ignition control system, as recited in claim 2, in which said idle and low speed throttle means is a throttle plate.

5. A fuel and ignition control system, as recited in claim 4, in which said high speed throttle means is a throttle plate and said idle and low speed throttle plate is mounted on said high speed throttle plate.

6. A fuel and ignition control system, as recited in claim 5, in which said high speed throttle plate is mounted for rotation in said high speed venturi in said carburetor between an open position for flow of air through said high speed venturi and a closed position for cutting off said flow of air through said high speed venturi.

7. A fuel and ignition control system, as recited in claim 6, in which said means for regulating said high speed and said idle and low speed throttle plates is a shaft, said shaft including means intermediate said high speed and said idle and low speed throttle plates and said shaft for first closing said high speed throttle plate for cutting off said flow of air through said high speed venturi and, after said high speed throttle plate is closed, then closing said idle and low speed throttle plate for cutting off the flow of air through said idle and low speed venturi as said regulating shaft is rotated in the closing direction.

8. A fuel and ignition control system, as recited in claim 7, in which said throttle plates regulating shaft includes means intermediate said throttle plates and said shaft for first closing said high speed throttle plate and then closing said idle and low speed throttle plate when said shaft is rotated in a first direction and for first opening said idle and low speed throttle plate and then opening said high speed throttle plate when said shaft is rotated in the opposite direction.

9. A fuel and ignition control system, as recited in claim 8, in which said dry proportioning accelerating means includes a housing, said means for connecting said accelerating means to said intake manifold being connected to said housing at one side of said means responsive to an increase in intake manifold pressure and said means for connecting said accelerating means to said carburetor being connected to said housing at the opposite side of said means responsive to an increase in manifold pressure.

10. A fuel and ignition control system, as recited in claim 9, in which said means responsive to an increase in manifold pressure includes a diaphragm.

11. A fuel and ignition control system, as recited in claim 10, in which said means responsive to an increase in manifold pressure includes a spring at the side of said diaphragm connected to said intake manifold.

12. A fuel and ignition control system, as recited in claim 11, in which said fuel evaporator means includes an elbow connected at its upper end to the air-fuel mixture discharge end of said carburetor and connected at its lower end to said liquid fuel recuperator and means for heating said elbow with engine coolant.

13. A fuel and ignition control system, as recited in claim 12, in which said liquid fuel recuperator includes a first section connected to the air-fuel mixture discharge end of said carburetor and a second section connected to the intake manifold and means intermediate said first and second sections for trapping and removing liquid fuel flowing through said first section and for preventing said liquid fuel from flowing into said second section.

14. A fuel and ignition control system, as recited in claim 13, in which said first section includes an outwardly flared end at said intermediate means and said second section includes an enlarged end at said intermediate means, said outwardly flared end of said first section being positioned in said enlarged end of said second section and an annular housing around said flared and enlarged ends.

15. A fuel and ignition control system, as recited in claim 14, in which said means for drawing liquid fuel from said recuperator includes a line connected at one of its ends to said annular housing and connected at its opposite end to a sump.

16. A fuel and ignition control system, as recited in claim 15, in which said means for drawing liquid fuel from said recuperator further includes a one-way valve in said line connecting said annular housing and said sump.

17. A fuel and ignition control system, as recited in claim 15, in which said means for drawing liquid fuel from said recuperator further includes a venturi in said intake manifold, said conduit being connected to said venturi in said intake manifold.

18. A fuel and ignition control system, as recited in claim 15, in which said means for drawing liquid fuel from said recuperator includes a vacuum pump in said conduit connecting the upper end of said sump to said intake manifold.

19. A fuel and ignition control system, as recited in claim 15, in which said means for removing liquid fuel from the bottom of said sump includes a solenoid controlled pump.

20. A fuel and ignition control system for an internal combustion engine having an intake manifold and carburetor comprising high speed venturi in said carburetor at least one idle and low speed venturi in said high speed venturi, high speed throttle means for regulating the flow of air through said high speed venturi and for cutting off the flow of air therethrough, idle and low speed throttle means on said high speed throttle means for regulating the flow of air through said idle and low speed venturi and for cutting off the flow of air therethrough, means for regulating said high speed and said idle and low speed throttles, a distributor, a vacuum control means on said distributor, means connecting said vacuum control means to the intake manifold of the engine for actuating said vacuum control in response to the pressure in said intake manifold, and valve means on said throttle regulating means for venting said vacuum control connecting means to the atmosphere when said throttles are at idle engine speed and for connecting said connecting means to said intake manifold when said idle and low speed throttle is opened, a dry proportioning accelerating means, means for connecting said acclerating means to said intake manifold, means for connecting said acclerating means to said carburetor, and means in said accelerating means responsive to an increase in pressure in said intake manifold for forcing liquid fuel from said carburetor into the carburetor air stream in proportion to the rate of increase in pressure in said intake manifold, an air intake duct connected to the air inlet of said carburetor, a heat exchanger on said air intake duct for heating intake air passing through said duct, means for circulating coolant from the coolant pump of the engine through said heat exchanger, a thermostatically controlled valve in said coolant circulating means, means in said intake air stream for controlling said thermostatically controlled valve, fuel evaporator means connected at its upstream ends to the air-fuel mixture discharge end of said carburetor, a liquid fuel recuperator connected at one of its ends to the downstream end of said evaporator and connected at its opposite end to said intake manifold, a heating jacket on said intake manifold and said evaporator, means connected to the engine coolant pump for circulating heated coolant through said heating jacket, a liquid fuel sump, means for drawing liquid fuel from said recuperator to said sump, a conduit connecting the upper end of said sump to said intake manifold, means for heating said liquid fuel drawing means and said conduit for vaporizing liquid fuel in said drawing means and for maintaining said fuel vaporized in said conduit, means for drawing the vaporized fuel from said conduit into said intake manifold and means for removing liquid fuel from the bottom of said sump.

21. A fuel and ignition control system, as recited in claim 20, in which said high speed and idle and low speed throttle means is a sliding valve.

22. A fuel and ignition control system, as recited in claim 21, in which said high speed throttle means is a throttle plate.

23. A fuel and ignition control system, as recited in claim 21, in which said idle and low speed throttle means is a throttle plate.

24. A fuel and ignition control system, as recited in claim 23, in which said high speed throttle means is a throttle plate and said idle and low speed throttle plate is mounted on said high speed throttle plate.

25. A fuel and ignition control system, as recited in claim 24, in which said high speed throttle plate is mounted for rotation in said high speed venturi in said carburetor between an open position for flow of air through said high speed venturi and a closed position for cutting off said flow of air through said high speed venturi.

26. A fuel and ignition control system, as recited in claim 25, in which said means for regulating said high speed and said idle and low speed throttle plates is a shaft, said shaft including means intermediate said high speed and said idle and low speed throttle plates and said shaft for first closing said high speed throttle plate for cutting off said flow of air through said high speed venturi and, after said high speed throttle plate is closed, then closing said idle and low speed throttle plate for cutting off the flow of air through said idle and low speed venturi as said regulating shaft is rotated in the closing direction.

27. A fuel and ignition control system, as recited in claim 26, in which said throttle plates regulating shaft includes means intermediate said throttle plates and said shaft for first closing said high speed throttle plate and then closing said idle and low speed throttle plate when said shaft is rotated in a first direction and for first opening said idle and low speed throttle plate and then opening said high speed throttle plate when said shaft is rotated in the opposite direction.

28. A fuel and ignition control system, as recited in claim 20, further including a distributor, a vacuum control means on said distributor, means connecting said vacuum control means to the intake manifold of the engine for actuating said vacuum control in response to the pressure in said intake manifold, and valve means on said throttle regulating means for venting said vacuum control connecting means to the atmosphere when said throttles are at idle engine speed and for connecting said connecting means to said intake manifold when said idle and low speed throttle is opened.

29. A fuel and ignition control system, as recited in claim 28, further including a dry proportioning accelerating means, means for connecting said accelerating means to said intake manifold, means for connecting said accelerating means to said carburetor, and means in said accelerating means responsive to an increase in pressure in said intake manifold for forcing liquid fuel from said carburetor into the carburetor air stream in proportion to the rate of increase in pressure in said intake manifold.

30. A fuel and ignition control system, as recited in claim 29, in which said dry proportioning accelerating means includes a housing, said means for connecting said accelerating means to said intake manifold being connected to said housing at one side of said means responsive to an increase in intake manifold pressure and said means for connecting said accelerating means to said carburetor being connected to said housing at the opposite side of said means responsive to an increase in manifold pressure.

31. A fuel and ignition control system, as recited in claim 30, in which said means responsive to an increase in manifold pressure includes a diaphragm.

32. A fuel and ignition control system, as recited in claim 31, in which said means responsive to an increase in manifold pressure includes a spring at the side of said diaphragm connected to said intake manifold.

33. A fuel and ignition control system, as recited in claim 32, further including an air intake duct connected to the air inlet of said carburetor, a heat exchanger on said air intake duct for heating intake air passing through said duct, means for circulating coolant from the coolant pump of the engine through said heat exchanger, a thermostatically controlled valve in said coolant circulating means, means in said intake air stream for controlling said thermostatically controlled valve, fuel evaporator means connected at its upstream ends to the air-fuel mixture discharge end of said carburetor, a liquid fuel recuperator connected at one of its ends to the downstream end of said evaporator and connected at its opposite end to said intake manifold, a heating jacket on said intake manifold and said evaporator, means connected to the engine coolant pump for circulating heated coolant through said heating jacket, a liquid fuel sump, means for drawing liquid fuel from said recuperator to said sump, a conduit connecting the upper end of said sump to said intake manifold, means for heating said liquid fuel drawing means and said conduit for vaporizing liquid fuel in said drawing means and for maintaining said fuel vaporized in said conduit, means for drawing the vaporized fuel from said conduit into said intake manifold and means for removing liquid fuel from the bottom of said sump.

34. A fuel and ignition control system, as recited in claim 33, in which said fuel evaporator means includes an elbow connected at its upper end to the air-fuel mixture discharge end of said carburetor and connected at its lower end to said liquid fuel recuperator and means for heating said elbow with engine coolant.

35. A fuel and ignition control system, as recited in claim 34, in which said liquid fuel recuperator includes a first section connected to the air-fuel mixture discharge end of said carburetor and a second section connected to the intake manifold and means intermediate said first and second sections for intercepting and removing liquid fuel flowing through said first section and for preventing said liquid fuel from flowing into said second section.

36. A fuel and ignition control system, as recited in claim 35, in which said first section includes an outwardly flared end at said intermediate means and said second section includes an enlarged end at said intermediate means, said outwardly flared end of said first section being positioned in said enlarged end of said second section and an annular housing around said flared and enlarged ends.

37. A fuel and ignition control system, as recited in claim 36, in which said means for drawing liquid fuel from said recuperator includes a line connected at one of its ends to said annular housing and connected at its opposite end to said sump.

38. A fuel and ignition control system, as recited in claim 37, in which said means for drawing liquid fuel from said recuperator further includes a one-way valve in said line connecteding said annular housing and said sump.

39. A fuel and ignition control system, as recited in claim 37, in which said means for drawing liquid fuel from said recuperator further includes a venturi in said intake manifold, said conduit being connected to said venturi in said intake manifold.

40. A fuel and ignition control system, as recited in claim 37, in which said means for drawing liquid fuel from said recuperator includes a vacuum pump in said conduit connecting the upper end of said sump to said intake manifold.

41. A fuel and ignition control system, as recited in claim 37, in which said means for removing liquid fuel from the bottom of said sump includes a solenoid controlled pump.

42. A fuel and ignition control system for an internal combustion engine having an intake manifold and a carburetor comprising, an air intake duct connected to the air inlet of said carburetor, a heat exchanger on said air intake duct for heating intake air passing through said duct, means for circulating coolant from the coolant pump of the engine through said heat exchanger, a thermostatically controlled valve in said coolant circulating means, means in said intake air stream for controlling said thermostatically controlled valve, fuel evaporator means connected at its upstream ends to the air-fuel mixture discharge end of said carburetor, said fuel evaporator means including an elbow connected at its upper end to the air-fuel mixture discharge end of said carburetor and connected at its lower end to said liquid fuel recuperator, a liquid fuel recuperator connected at one of its ends to the downstream end of said evaporator and connected at its opposite end to said intake manifold, said liquid fuel recuperator including a first section connected to the air-fuel mixture discharge end of said carburetor and a second section connected to the intake manifold and means intermediate said first and second sections for intercepting and removing liquid fuel flowing through said first section and for preventing said liquid fuel from flowing into said second section, said first section including an outwardly flared end at said intermediate means and said second section including an enlarged end at said intermediate means, said outwardly flared end of said first section being positioned in said enlarged end of said second section and an annular housing around said flared and enlarged ends, a heating jacket on said intake manifold and said evaporator, means connected to the engine coolant pump for circulating heated coolant through said heating jacket, a liquid fuel sump, means for drawing liquid fuel from said recuperator to said sump including a line connected at one of its ends to said annular housing and connected at its opposite end to said sump, a conduit connecting the upper end of said sump to said intake manifold, means for heating said liquid fuel drawing means and said conduit for vaporizing liquid fuel in said drawing means and for maintaining said fuel vaporized in said conduit, means for drawing the vaporized fuel from said conduit into said intake manifold and means for removing liquid fuel from the bottom of said sump.

43. A fuel and ignition control system, as recited in claim 42, in which said means for drawing liquid fuel from said recuperator further includes a one-way valve in said line connecting said annular housing and said sump.

44. A fuel and ignition control system, as recited in claim 42, in which said means for drawing liquid fuel from said recuperator further includes a venturi in said intake manifold, said conduit being connected to said venturi in said intake manifold.

45. A fuel and ignition control system, as recited in claim 42, in which said means for drawing liquid fuel from said recuperator includes a vacuum pump in said conduit connecting the upper end of said sump to said intake manifold.

\* \* \* \* \*